United States Patent [19]
Peters

[11] 4,164,380
[45] Aug. 14, 1979

[54] MILLING CUTTER WITH ADJUSTMENT FOR FACE RUNOUT

[75] Inventor: Robert W. Peters, Saegertown, Pa.

[73] Assignee: Greenleaf Corporation, Saegertown, Pa.

[21] Appl. No.: 881,400

[22] Filed: Feb. 27, 1978

[51] Int. Cl.[2] .............................................. B26D 1/12
[52] U.S. Cl. .................................... 407/36; 407/41; 407/44; 407/49
[58] Field of Search ..................... 407/37, 41, 36, 45, 407/46, 44, 49, 88, 94, 108

[56] References Cited
U.S. PATENT DOCUMENTS

| | | | |
|---|---|---|---|
| 1,413,665 | 4/1922 | Lane et al. .......................... 144/230 |
| 3,116,538 | 1/1964 | Severson ............................... 407/41 |
| 3,229,350 | 1/1966 | Yogus ..................................... 407/41 |
| 3,795,454 | 3/1974 | Elchyshyn .......................... 408/197 |
| 4,009,742 | 3/1977 | Ziegelmeyer ......................... 407/49 |
| 4,101,239 | 7/1978 | Wohlhaupter ........................ 407/37 |

*Primary Examiner*—Leonidas Vlachos
*Attorney, Agent, or Firm*—Ralph Hammar

[57] ABSTRACT

A milling cutter with an infinite adjustment for face run out of the cutting edges in which each cutting edge may be held within 1/10,000 of an inch or less of a common plane. For numerically controlled machines the common plane may be located a fixed distance from the back of the cutter body. Another feature is a positive stop on the wedge which guarantees that once adjusted each insert will remain in adjusted position.

2 Claims, 4 Drawing Figures

MILLING CUTTER WITH ADJUSTMENT FOR FACE RUNOUT

High quality finishes require milling cutter inserts with a face run out of the inserts adjusted to 1/10,000 of an inch, much more accurate than can be obtained from precision inserts alone. Heretofore this adjustment has been obtained by clamping the inserts by wedges in open ended slots in the cutter body and by using a dial indicator to indicate when the cutting edges of the inserts were adjusted to a common plane. Instead of changing bits on the machine, the operator removes the milling cutter body and exchanges the body for a new body with freshly adjusted inserts. For numerically controlled machines the "common plane" is a fixed distance from the back of the cutter body.

This invention is a structure which will permit the setting and maintenance of the required fine adjustment.

In the drawings FIG. 1 is a fragmentary end view of a milling cutter,

Figure 1:
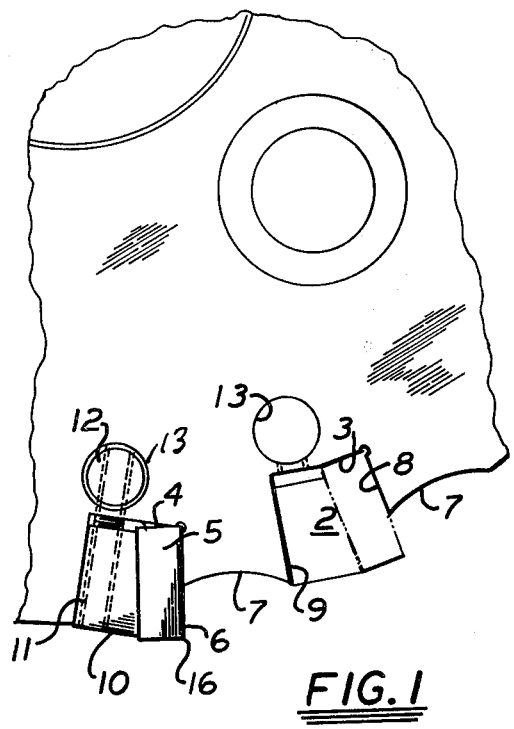
FIG. 1A is a view of one of the slots of FIG. 1 with the wedge and bit removed.

Referring to the drawing, a milling cutter has a body 1 with a plurality of open ended slots 2 extending axially through the rim thereof. In the bottom of the slot is a seat 3 for the inner edge 4 of a cutting insert or bit 5. The front or cutting face 6 of the bit has a chip clearance groove 7 in front of the front side 8 of the slot. The back side 9 of the slot is inclined and coacts with a wedge 10 which is tightened against the cutting insert by a screw 11 extending inward through the bottom of the slot 2 into a pin 12 slidably received in an axially extending hole 13 in the cutter body. The pin 12 provides a large area of contact with the cutter body so that local deformation or coining of the body by the pin is prevented. This problem is important in parts which are to be clamped in precise positions. If a previous adjustment has caused coining of the metal, and a new adjusted position were only 1/10,000 of an inch away from the previous position, there may be a tendency for the parts to slip back to the old position as the clamp is tightened. The screw 11 is preferably a differential screw or left hand thread on one end - right hand thread on the other end which provide a mechanical advantage and also provide for speedier tightening and release of the wedge 10. The back edge 14 of the bit rests against a seat 15 on the wedge. When the wedge is tightened the bit is securely supported so there is substantially no chance of moving the bit out of place once it has been adjusted and its wedge tightened.

Figure 2:
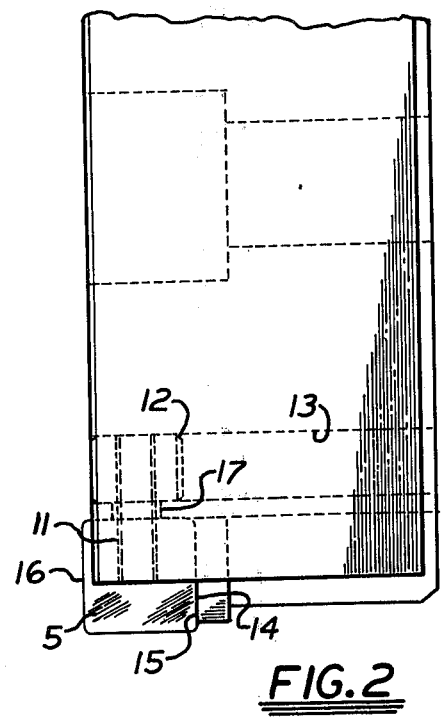
FIG. 2 is an edge view of the milling cutter.
Figure 1A:
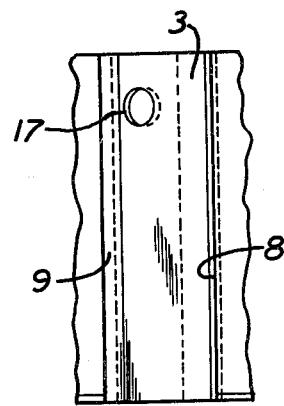
Figure 3:
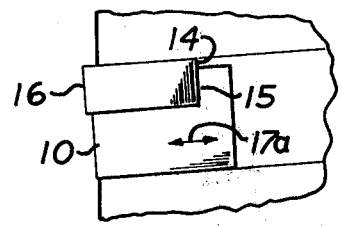
FIG. 3 is a view illustrating the supporting and clamping functions of the wedge.

In use, the bits are inserted in the cutter body and using a dial indicator, one by one each bit is adjusted so that its cutting edge 16 is within 1/10,000 of an inch of a common plane. This involves loosening of the screw 11 for the bit being adjusted and moving the wedge forward and backward as required in the direction of arrow 17 on the wedge as indicated in FIG. 3. A convenient way to move the wedge is by finger pressure and insert or on the ends of the pin 12. The pin slides easily. If the pin is recessed into the hole 13 as appears at the right of FIG. 2, finger pressure may be transmitted to the pin through an intermediate member (not shown). The screw 11 ties the wedge and pin together. The sliding movement of the wedge is made possible by a clearance hole 17 in the cutter body around the screw 11. The clearance provided by the hole 17 is greatly exaggerated. It is only necessary to have enough clearance to take care of the necessary adjustments. Once the desired dial indicator reading is obtained, the screw 11 for the bit being adjusted is tightened firmly and the adjustment proceeds to the next bit.

After adjustment, the bits can make higher quality finishes than would be possible with preoision bits. Yet precision bits are not required because the adjustment brings the active cutting edges so close to a common plane.

If the threads on the pin 12 should be damaged or the screw broken off, it is relatively easy to replace the pin as compared to a similar repair on a milling cutter body with the screw threads tapped directly into the body. This suggest that the pin may find use as a replacement for use with conventional wedges where the screw threads are in the body.

I claim:

1. A milling cutter body having a bit receiving slot, an indexable bit in said slot, said body having a seat parallel to said one side of the slot for receiving one edge of the bit, a wedge in said slot movable toward and away from the bottom of the slot to clamp and unclamp the bit against one side of the slot, the wedge having a seat for another edge of the bit, a pin slidable in said body below the bottom of the slot, a differential screw having one end screwed into the wedge and the other end screwed into the pin for moving the wedge toward and away from the bottom of the slot.

2. A milling cutter body having a rim and a bit receiving slot extending axially through the rim, an indexable bit in said slot, a seat in the bottom of the slot for one edge of the bit, a wedge extending toward the bottom of the slot, said wedge having a seat for another edge of the bit locating the bit on the wedge, a pin slidable in said body below the bottom of the slot, a differential screw having one end screwed into the wedge and the other end screwed into the pin for moving the wedge toward and away from the bottom of the slot, a clearance hole in the body for the screw whereby the wedge can be moved forward and backward in said slot when the screw is loosened.

* * * * *